F. W. G. LIEBERG.
AUTOMOBILE LOCK.
APPLICATION FILED JAN. 21, 1920.
1,371,384.
Patented Mar. 15, 1921.
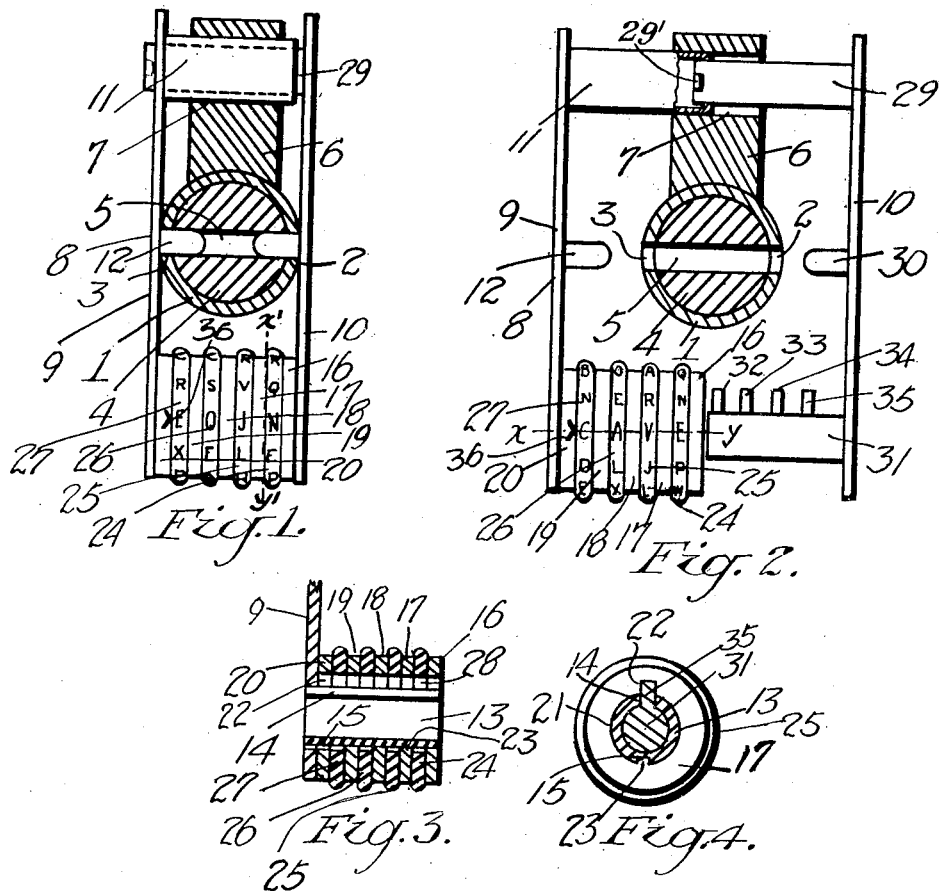
INVENTOR.
FREDERICK W. G. LIEBERG.

UNITED STATES PATENT OFFICE.

FREDERICK WILLIAM GUY LIEBERG, OF TRINIDAD, COLORADO, ASSIGNOR OF ONE-THIRD TO HERBERT PAINTER, OF TORONTO, ONTARIO, CANADA.

AUTOMOBILE-LOCK.

1,371,384.      Specification of Letters Patent.      Patented Mar. 15, 1921.

Application filed January 21, 1920. Serial No. 353,004.

*To all whom it may concern:*

Be it known that I, FREDERICK WILLIAM GUY LIEBERG, farmer, residing at 1517 Nevada avenue, in the town of Trinidad, in the State of Colorado, United States of America, have invented certain new and useful Improvements in Automobile-Locks, of which the following is the specification.

My invention relates to improvements in automobile locks and the object of the invention is to devise a simple device for locking the steering post to the column so as to prevent the operation of the steering wheel when the car is standing idle and also to provide means whereby such lock can only be operated when a predetermined combination of letters or signs are moved into consecutive relation to form a chosen word or combination of signs and it consists essentially of the arrangement and construction of parts as hereinafter more particularly explained.

Figure 1, is a plan view of my lock showing it in engagement with the steering post and column such post and column being in section.

Fig. 2, is a similar view to Fig. 1 showing the lock in the unlocked position.

Fig. 3, is a sectional view on line *x—y* Fig. 2.

Fig. 4, is a sectional view on line *x'—y'* Fig. 1.

In the drawings like characters of reference indicate various parts in each figure.

1 indicates the steering column provided with diametrically opposite orifices 2 and 3. 4 is the steering post provided with a diametric orifice 5 designed to be brought into alinement with the orifices 2 and 3. 6 is a lug which extends from the column 1 and is provided with an orifice 7. 8 indicates my lock.

The lock 8 comprises side bars 9 and 10 the side bar 9 being provided with a sleeve like portion 11 formed integral therewith, a projection 12 extending inwardly from the bar 9 intermediately of its length and a sleeve 13 extending inwardly from the opposite end of the bar 9. The sleeve 13 is provided with a longitudinal slot 14 and diametrically opposite to the slot 14 with a longitudinal groove 15 formed in its exterior periphery. 16, 17, 18, 19 and 20 are a series of spacing disks provided with a central orifice 21 from which extends a notch 22 at one side, the diametrically opposite side of the orifice 21 being provided with an inwardly extending projection 23 adapted to fit into the groove 15 of the sleeve 13 so as to prevent the rotation of the disks upon the sleeve. 24, 25, 26 and 27 are a series of tumbler disks which are located intermediately between each pair of disks 16, 17, 18, 19 and 20. The disks 24, 25, 26 and 27 are provided with notches 28 corresponding in size to the notches 22. The tumbler disks, however, are not provided with inwardly extending projections corresponding to the projections 23 and so are, therefore, turnable about the sleeve 13. The exterior periphery of the disks 24, 25, 26 and 27 protrude outwardly beyond the disks 16, 17, 18, 19 and 20 so that they may be engaged by the fingers of the operator to be turned independently to any desired position.

Each disk is provided with a series of letters or signs such as indicated in Figs. 1 and 2. In order to open the lock the disks 24 to 27 must be turned to a certain position so as to bring the notches 28 of each disk 24 to 27 in alinement and also into alinement with the notches 22 of the disks 16 to 20. In order to do this the letters C. A. V. E. must be brought into alinement. When these letters are in alinement as indicated in Fig. 2 the notches 28 and 22 are in alinement and the lock may be locked or unlocked as desired.

The bar 10 is provided at one end opposite the sleeve 11 with a pin 29 slidably received in said sleeve. To prevent complete withdrawal of the pin from the sleeve, the former is provided at its inner end with a lateral stop projection 29' and the open end of the sleeve is restricted to provide a shoulder portion adapted to coöperate with said projection in preventing complete withdrawal of the pin 29, as more clearly shown in Fig. 2. The bar 10 is provided with a projection 30 intermediate of its length such projection being located opposite to the projection 12 of the bar 9. The opposite end of the bar 10 is provided with an inwardly extending locking pin 31 from which extends a series of radial projections 32, 33, 34 and 35.

When the locking pin is in the locking position within the sleeve 13 the projections 32 to 35 are in circumferential alinement with the notches 22, the disks 24 to 27 of course being turned to any undetermined position so as to prevent the withdrawal of the locking pin 31.

In unlocking my lock all that it is necessary to do is, when the parts are in the position shown in Fig. 1, to turn the disks 24 to 27 into position so that the letters C. A. V. E, are in alinement across the face of the lock, and into alinement with an indicating mark on the stationary portion of the lock such as at 36. When in this position the bars 9 and 10 may be pulled apart or into the position shown in Fig. 2 thereby withdrawing the projections 12 and 30 from engagement with the orifices 3, 5 and 2. When this has been done the steering post is free to turn within the steering column and can be operated in the usual manner.

In locking my device all that it is necessary to do is to force the bars 9 and 10 together so as to carry the projections 12 and 30 into the orifices 3 and 2. When this is done the steering post is turned, the fingers of the operator pressing upon the bars 9 and 10 until the projections 12 and 30 are forced into the orifice 5 as it is brought into alinement with the orifices 3 and 2. When the projections 12 and 30 are brought into this position the locking pin 31 is within the sleeve 13 and the projections 32 and 35 are in alinement with the notches 22 of the disks 16 to 20. The tumbler disks 24 to 27 are then turned so that the notches thereof will be out of alinement one with the other and would thereby prevent the withdrawal of the locking pin 31.

From this description it will be seen that I have devised a very simple form of lock for automobiles which cannot be opened until a predetermined combination of letters or signs are brought into alinement and which therefore provides a lock which it will be very difficult to open and which thereby insures safety for the car.

What I claim as my invention is.

1. The combination with the steering post and column having orifices adapted to be brought into diametric alinement, of a bar located at each side of the steering column, projections extending inwardly from each bar into the orifices when in alinement, a slidable connection permitting lateral movement of the bars, and means for locking the opposite ends of the bars together when in their inner position.

2. The combination with the steering post and column having orifices adapted to be brought into diametric alinement, of a bar located at each side of the steering column, projections extending inwardly from each bar into the orifices when in alinement, a slidable connection between one end of each bar, and a combination locking device for locking the opposite ends of the bars together.

3. The combination with the steering post and column having orifices adapted to be brought into diametric alinement, of a bar located at each side of the steering column, projections extending inwardly from each bar into the orifices when in alinement, a slidable connection between one end of each bar, and a locking pin extending inwardly from one bar having radially extending locking projections, a slotted sleeve opposing the locking pin and carried by the other bar, a series of spacing disks held in a stationary position upon the sleeve and having radial notches through each of which the locking projections are adapted to pass, tumbler disks interposed between the spacing disks and provided with radial notches adapted to be brought into alinement with the notches of the spacing disks, and visible means for indicating when the notches are in or out of alinement.

FREDERICK WILLIAM GUY LIEBERG.